United States Patent [19]

Bergström et al.

[11] Patent Number: 4,746,704

[45] Date of Patent: May 24, 1988

[54] CHEMICALLY MODIFIED POLYOLEFIN

[75] Inventors: Christer Bergström; Barbro Björkvall, both of Helsinki; Bengt Stenlund, Porvoo; Jouko Huttunen, Porvoo; Carl-Johan Johansson, Porvoo, all of Finland

[73] Assignee: Neste Oy, Finland

[21] Appl. No.: 931,851

[22] Filed: Nov. 18, 1986

[30] Foreign Application Priority Data

Nov. 21, 1985 [FI] Finland ................................. 854608

[51] Int. Cl.4 ................... C08F 265/00; C08F 265/04; C08F 267/00; C08F 267/06
[52] U.S. Cl. ..................................... 525/301; 428/260

[58] Field of Search ......................................... 525/301

[56] References Cited

U.S. PATENT DOCUMENTS 3,862,265  1/1975  Steinkamp et al. .................. 525/301
4,639,495  1/1987  Waggoner ............................ 525/301

Primary Examiner—Jacob Ziegler
Attorney, Agent, or Firm—Steinberg & Raskin

[57] ABSTRACT

The present invention relates to a chemically modified polyolefin exhibiting good adhesion to metals and other polar substances. The polyolefin has itaconic acid grafted thereto.

2 Claims, No Drawings

CHEMICALLY MODIFIED POLYOLEFIN

BACKGROUND OF THE INVENTION

The present invention relates to a chemically modified polyolefin which has good adhesion to metals and to other polar substances.

Polyethylene and polyolefins generally have poor adhesion to metals and to materials containing polar groups. Somewhat better adhesion has been achieved in certain instances by copolymerizing unsaturated esters such as vinyl acetate or alkylacrylate (methylacrylate, ethylacrylate, butylacrylate, etc.), but even these copolymers display insufficient adhesion in most multi-ply structures.

Many ways to improve adhesion have been tried. For example, unsaturated acids or acid anhydrides have been used as comonomers, particularly in the polymerizing of copolymers or terpolymers. Examples of commercial applications include ethylene/acrylic acid copolymer containing 9% acrylic acid, and ethylene/methacrylic acid copolymer containing 9% methacrylic acid. One known commercial terpolymer contains 4% acrylic acid and 7% butylacrylate. A product in which the methacrylic acid is partially neutralized to a salt so that a so-called ionomer has been obtained, is also commercially available. An application in which maleic acid anhydride has been grafted to LDPE, HDPE, or EVA, is an example of the use of maleic acid anhydride for better adhesion. Another example is the terpolymer of ethylene, butylacrylate and maleic acid anhydride.

Direct copolymerizing of ethylene with an unsaturated acid is disadvantageous for a number of reasons. The acids are corrosive and curtail the life span of the processing apparatus, both in the synthesis step and in the working step. Moreover, these ethylene/ acid copolymers or terpolymers are thermally unstable, and low work- ing temperatures must therefore be employed, leading to restrictions on the production rate and product quality. Large acid quantities are indispensable for reaching satisfactory adhesion, because these copolymerized acids are immobile, and it is thus difficult for the acids to force themselves out from the polymer matrix to reach the polar groups present in the other boundary layer.

Large acid quantities are also required in order to lower the crystallinity, this being indispensable if adhesion is to be achieved. This can also naturally be achieved by using a third monomer, such as butylacrylate or vinyl acetate, for example. However, terpolymers are uneconomical regarding recovery of the copolymers in the synthesis. As a result, the content of the comonomer which is active regarding adhesion, is limited. The total content of the comonomer is also limited in view of foodstuff compatibility, under the laws of various countries. High vinyl acetate quantities also introduce corrosion problems. Crystallinity may also be lowered by admixing a thermoplastic elastomer, such as polyisobutylene (PIB), for example. It has been endeavored to improve the mobility of maleic acid anhydride when grafting the same, by, for example, using spacer groups between the maleic acid anhydride and polymer (Diels-Alder reaction between diene and maleic acid anhydride, and grafting thereof to the polymer).

SUMMARY OF THE INVENTION

Accordingly, it is an object of the present invention to achieve improvement over the presently known modified polyolefins.

These and other objects are attained by the present invention which is directed to a chemically modified polyolefin having good adhesion to metals and to other polar substances, the modified polyolefin having itaconic acid grafted thereto.

When a polyolefin is grafted with itaconic acid in accordance with the present invention, the conditions are considerably more favorable than in the instances noted above. Itaconic acid is considerably less corrosive than, for instance, acrylic acid, methacrylic acid or maleic acid anhydride. By grafting itaconic acid to polyolefin, much lower amounts can be used than when copolymerizing unsaturated acids. When itaconic acid is grafted to polyolefin, adhesion is obtained which is better the lower the degree of crystallization, because a lower degree of crystallization produces lower stresses in the boundary surface. The polyolefins with low degree of crystallization which are appropriate for use to this end, include, for example, EBA (ethylene/butylacrylate), EEA (ethylene/ethylacrylate), EMA (ethylene/methylacrylate), and EVA (ethylene/vinyl acetate). VLDPE (very low density polyethylene), which is manufactured by a coordination polymerizing procedure from ethylene and a higher olefin, is also suitable for this use.

When polyolefins having a low degree of crystallization are grafted with itaconic acid, it is possible to achieve good adhesion with acid amounts which are less than 1%, such as about 0.1-1% of the weight of the polyolefin (all percents as used herein are by weight unless otherwise noted). An acid content as low as this, is extremely favorable, considering raw material costs, life span of processing apparatus (minimal corrosion) and manufacturing technique (the grafting polymer concentrate may be diluted). Moreover, itaconic acid is less corrosive than, e.g., acrylic acid, methacrylic acid, or maleic acid anhydride, which even at low concentrations give rise to corrosion and, for this reason, to discoloring of the product.

Itaconic acid is also superior with respect to labor hygiene and foodstuff compatibility, and is easier to handle in production because it comes in solid form and has a high boiling point.

Itaconic acid becomes grafted far more efficiently than, e.g., acrylic acid, methacrylic acid, or maleic acid anhydride, which tend to boil off in connection with compounding and, furthermore, become incompletely grafted. A far lower acid content can be used when conducting grafting with itaconic acid, than in the copolymerizing process. For this reason, better thermal stability is obtained and lower comonomer amounts may be used and thus meet foodstuff compatibility requirements in various applications, in this manner.

DESCRIPTION OF THE PREFERRED EMBODIMENTS

When polyolefins are grafted with itaconic acid in accordance with the present invention, the starting materials are the above-noted polyolefin, 0.1-20% itaconic acid, and 0.01-0.5% radical former. These ingredients are mixed at a temperature at which the mixture is in molten state and the radical former is decomposed and forms those radicals which cause the grafting. Mixing may be in a batch process or continuously, while the components may be added all at one time or separately, or in pairs. It is most advantageous if the mixture is first melt homogenized at a lower temperature, with the temperature then being raised to a level at which the radical former forms radicals. Grafting may also be accomplished in a manner other than as just described.

When a polyolefin is grafted with itaconic acid, any polyolefin may be used as the base polymer. However, it is to the greatest advantage to use an ethylene copolymer having the lowest possible degree of crystallization. For example, LDPE, HDPE, MDPE, LLDPE, PP, or PB may be used, though preferably EVA, EBA, EEA, EMA, or VLDPE or other ethylene copolymers or polyolefin mixtures are used. By adding, for example, a thermoplastic elastomer, it is possible to achieve efficient lowering of the degree of crystallization. Organic peroxides, peresters, percarbonates, or radical formers of another type may be used as the radical former. The following radical formers are generally used: dicumyl peroxide, cumyl tert. butylperoxide, or di-tert. butylperoxide. Moreover, the formulation may contain chain shift agents, antioxidants or other typical additives with polyolefins.

Polyolefin grafted with itaconic acid in the manner described above, may be used as so-called adhesion polymers in the manufacturing of multi-ply products which contain one or several polyolefin courses or layers and one or several courses or layers of polar plastic (such as polyamide, polyester, ethylene vinyl alcohol (EVOH), etc.) or of metal (such as aluminum, steel, copper, etc.). The products may possibly have one or several courses or layers of unmodified polyolefin. Such multi-ply products may be produced by coextrusion, by (co)extrusion coating, or by (co)extrusion lamination, the object being films, sheets, tubes, cables, bottles, etc. It is also possible to use such adhesion plastic as an adhesion layer in powder coating steel tubes, for example. In so-called plastic alloys, which are composed of immiscible (e.g. polar and non-polar) plastics, these adhesion plastics may likewise be used as so-called emulsifier polymers in order to achieve adhesion between the two phases and, thereby, better technological properties. The adhesion to other polar material, (e.g. glass, minerals, wood) may also be improved in this manner.

The invention will now be described in greater detail with respect to the following non-restrictive examples:

EXAMPLE 1

In a Brabender extruder ($\phi=19$ mm, L $=20$ D, and compression ratio 3:1), mixtures of LDPE (MI$=4$, $\rho$ 0.922) and EBA (MI $=4$, BA 17%) were extruded in different proportions, together with 0.05% ditertiary butylperoxide and 1% unsaturated acid (itaconic acid, IA; acrylic acid, AA; maleic acid anhydride, MAN). The temperature in the extrusion press was 105° C., 200° C., and 250° C., while the temperature in the nozzle was 250° C., the nozzle was of the coextrusion type, with PA-6 (BASF Ultramid B4) being extruded at 250° C. for the other course or layer. The speed of rotation of the screw was 41 min$^{-1}$.

In this manner, two-ply strips (acid-grafted polymer and PA-6) were extruded, and which were tested for adhesion after 24 hours. This test was conducted with the Instron pulling tester (Peel Test), with the pulling rate being 50 mm/min. The force was measured after equilibrium had been established, and was expressed in units of N/cm.

Table I reveals how the content of butylacrylate (BA) influences the adhesion:

TABLE I

| Polymer | Adhesion (N/cm) | | |
|---|---|---|---|
| % BA | 1% IA | 1% AA | 1% MAN |
| 0 | 5.8 | 5.8 | 3.5 |
| 5 | 6.4 | 6.4 | 6.6 |
| 10 | 18.9 | 12.8 | 9.7 |
| 13 | 27.5 | 23.0 | 19.8 |
| 17 | 53.0 | 37.3 | 40.2 |

It is seen from these results that a substantial improvement in adhesion to PA-6 takes place when the butylacrylate content of the acid-grafted polymer is increased. It may further be noted that itaconic acid is better than acrylic acid and maleic acid anhydride when the butylacrylate content is high. It may be noted for comparison that the adhesion of non-grafted 17% EBA is 0.5 N/cm, while an adhesion of 0.2 N/cm is obtained when non-grafted polyethylene is used.

EXAMPLE 2

The testing was performed in this case as in Example 1, with the exception that only EBA (MI $=4$, BA $=17\%$) was used as the base polymer while the acid content was varied. Table II reveals the influence of acid content (IA, AA, MAN) on adhesion:

TABLE II

| Acid content | Adhesion (N/cm) | | |
|---|---|---|---|
| % | IA | AA | MAN |
| 0.3 | 50.0 | 9.6 | 35.0 |
| 0.5 | 48.6 | 46.3 | 35.0 |
| 0.7 | 45.0 | 36.0 | 40.0 |
| 1.0 | 53.0 | 37.3 | 40.2 |
| 1.5 | 54.0 | 44.1 | 41.6 |

It is seen from these results that if the butylacrylate content is as high as 17%, then very low acid concentrations ($<1\%$) can be effective. In this case too, itaconic acid is superior to acrylic acid and maleic acid anhydride.

EXAMPLE 3

Testing was done in this case as in Example 1, with the exception that instead of EBA, EVA (MI$=2$, VA$=20\%$) was used for the ethylene component of the mixtures, while itaconic acid and acrylic acid were used for the unsaturated acids:

TABLE III

| Polymer | Adhesion (N/cm) | | |
|---|---|---|---|
| % comonomer | VA 1% IA | VA 1% AA | BA 1% IA |
| 0 | 5.8 | 5.8 | 5.8 |
| 5 | 9.2 | 8.6 | 6.4 |
| 10 | 12.2 | 17.8 | 18.9 |
| 13 | 32.2 | 25.3 | 27.5 |
| 17 | 33.0 | 28.5 | 53.0 |
| 20 | 41.7 | 34.3 | — |

It is seen from these results that adhesion to PA-6 is also substantially improved when the vinyl acetate content is increased, this being due to lowering of the degree of crystallization of the polymer. In this case too, better adhesion is obtained with itaconic acid than with acrylic acid when the vinyl acetate content is high. It may be noted by way of comparison that the adhesion of non-grafted 20% EVA is 0.5 N/cm.

EXAMPLE 4

Testing was carried out in this case as in Examples 1-3, with the exception that comparisons regarding adhesiveness to various materials (Polyamide 6, BASF Ultramid B4; ethylene/vinylalchohol (EVOH), EVAL-F; aluminum; steel) were conducted. A nozzle was constructed for metal coating, through which the metal strip (20 mm × 1.0 mm) could be pushed. EBA (M = 4, BA = 17%) was grafted with 1% itaconic acid and 1% acrylic acid, while EVA (MI = 2, VA = 20%) was grafted with 1% itaconic acid. It can be seen in Table IV how the graft polymers and their base polymers adhere to different metals:

TABLE IV

| Polymer | Adhesion (N/cm) | | | |
| --- | --- | --- | --- | --- |
|  | PA-6 | EVOH | Al | Fe |
| IA-grafted EBA | 53.0 | 14.9 | 18.4 | 11.5 |
| EBA | 0.5 | 3.0 | 10.5 | 9.8 |
| IA-grafted EVA | 41.7 | 6.0 | 35.1 | 37.3 |
| EVA | 0.5 | 1.0 | 14.7 | 6.6 |
| AA-grafted EBA | 37.3 | 6.4 | 50.3 | 82.6 |

It is seen from these results that both 17% EBA and 20% EVA exhibit some adhesion to aluminum and steel. However, remarkable improvement is achieved by grafting with itaconic acid. This improvement is greater in the case of EVA. When 17% EBA is grafted with acrylic acid, however, better adhesion than with itaconic acid is obtained.

The adhesion to ethylene/vinylalcohol (EVOH) also improves both with itaconic acid and with acrylic acid. In this case, as also in the case of PA-6, the combination of itaconic acid and EBA is most favorable.

EXAMPLE 5

Testing was carried out in this case as in Example 4, with the exception that comparisons were made with commercial adhesion polymers.

Tables V reveals how itaconic acid-grafted EBA and EVA adhere to different materials, as compared with commercial adhesion polymers:

TABLE V

| Polymer | Adhesion (N/cm) | | | |
| --- | --- | --- | --- | --- |
|  | PA | EVOH | Al | Fe |
| IA-grafted EBA | 53.0 | 14.9 | 18.4 | 11.5 |
| IA-grafted EVA | 41.7 | 6.0 | 35.1 | 35.3 |
| Primacor 1420 9% AA | 55.0 | 2.6 | 10.3 | 8.3 |
| Nucrel 0903 9% MAA | 23.3 | 1.3 | 7.0 | 3.4 |
| Surlyn 1650 12% MAA + Zn | 71.3 | 0 | 5.5 | 8.1 |
| CXA 3095 | 7.0 | 3.4 | 7.1 | 9.5 |
| Lupolen A2910M 4% AA + 7% BA | 36.6 | 3.4 | 6.4 | 7.5 |

It can be seen from these results that 17% EBA and 20% EVA to which 1% itacnic acid has been grafted, exhibit better adhesion to metals, such as aluminum and steel, and to EVOH, than commercial adhesion polymers. The adhesion to Polyamide-6 is also competitive.

The preceding description of the present invention is merely exemplary, and is not intended to limit the scope thereof in any way.

What is claimed is:

1. A chemically modified polyolefin having good adhesion to metals and other polar substances, said modified polyolefin having itaconic acid grafted thereto, wherein the polyolefin is ethylene butylacrylate (EBA)

2. The polyoefin of claim 1, wherein the amount of itaconic acid grafted thereto is about 0.1-1% of the weight of the polyolefin.

* * * * *